United States Patent
Thibadeau, Sr. et al.

(10) Patent No.: US 9,497,186 B2
(45) Date of Patent: Nov. 15, 2016

(54) METHODS AND SYSTEMS FOR SECURING PROOFS OF KNOWLEDGE FOR PRIVACY

(71) Applicants: Robert H. Thibadeau, Sr., Pittsburgh, PA (US); Justin D. Donnell, Verona, PA (US)

(72) Inventors: Robert H. Thibadeau, Sr., Pittsburgh, PA (US); Justin D. Donnell, Verona, PA (US)

(73) Assignee: Antique Books, Inc., Pittsburgh, PA (US)

( * ) Notice: Subject to any disclaimer, the term of this patent is extended or adjusted under 35 U.S.C. 154(b) by 0 days.

(21) Appl. No.: 14/823,739

(22) Filed: Aug. 11, 2015

(65) Prior Publication Data

US 2016/0044021 A1 Feb. 11, 2016

Related U.S. Application Data

(60) Provisional application No. 62/035,766, filed on Aug. 11, 2014.

(51) Int. Cl.
| | |
|---|---|
| *H04L 29/06* | (2006.01) |
| *G06F 21/00* | (2013.01) |
| *G06F 21/31* | (2013.01) |
| *H04L 9/32* | (2006.01) |

(52) U.S. Cl.
CPC .......... *H04L 63/0807* (2013.01); *G06F 21/31* (2013.01); *H04L 9/3271* (2013.01); *H04L 63/083* (2013.01); *H04L 63/0861* (2013.01); *G06F 2221/2103* (2013.01)

(58) Field of Classification Search
CPC .......... H04L 63/0807; H04L 63/0861; H04L 63/083
See application file for complete search history.

(56) References Cited

U.S. PATENT DOCUMENTS

| | | |
|---|---|---|
| 5,559,961 A | 9/1996 | Blonder |
| 6,209,104 B1 | 3/2001 | Jalili |
| 6,249,868 B1 | 6/2001 | Sherman et al. |
| 6,411,283 B1 | 6/2002 | Murphy |
| 6,658,328 B1 * | 12/2003 | Alrabady ........... G07C 9/00309 307/10.2 |

(Continued)

FOREIGN PATENT DOCUMENTS

| | | | |
|---|---|---|---|
| EP | 1601153 | * 11/2005 | ............. H04L 29/06 |
| EP | 1601153 A2 | 11/2005 | |

(Continued)

OTHER PUBLICATIONS

Non-Final Office Action for U.S. Appl. No. 14/693,121, mailed Aug. 6, 2015, 16 pages.

(Continued)

*Primary Examiner* — Lisa Lewis
(74) *Attorney, Agent, or Firm* — Withrow & Terranova, PLLC

(57) ABSTRACT

Embodiments described herein relate to securing the privacy of knowledge used to authenticate a user (i.e., Proof of Knowledge (PoK) test(s)). In some embodiments, a client device is operable to receive a first encryption key and encrypted test(s) from a PoK server. The client device also receives a second encryption key from a Relying Party (RP) server. The client device can decrypt the encrypted test(s) by using the first encryption key and the second encryption key to thereby render decrypted test(s). The client device is further operable to obtain answer(s) for the decrypted test(s), send a communication to the PoK server based on the answer(s), and receive a communication from the RP server that authorizes a user of the client device to access service(s) administered by the RP server.

12 Claims, 7 Drawing Sheets

(56) References Cited

U.S. PATENT DOCUMENTS

| | | | |
|---|---|---|---|
| 6,934,860 B1 | 8/2005 | Goldstein | |
| 6,983,065 B1* | 1/2006 | Akgul | G06K 9/4619 |
| | | | 348/125 |
| 7,243,239 B2 | 7/2007 | Kirovski et al. | |
| 7,370,351 B1 | 5/2008 | Ramachandran et al. | |
| 7,734,930 B2 | 6/2010 | Kirovski et al. | |
| 8,015,563 B2* | 9/2011 | Araujo, Jr. | G06F 21/6218 |
| | | | 713/1 |
| 8,024,775 B2 | 9/2011 | Xu et al. | |
| 8,155,622 B1 | 4/2012 | Moshenberg et al. | |
| 8,191,126 B2 | 5/2012 | Raghavan | |
| 8,353,016 B1 | 1/2013 | Pravetz et al. | |
| 8,392,975 B1 | 3/2013 | Raghunath | |
| 8,627,421 B1 | 1/2014 | Bowers et al. | |
| 8,813,183 B2 | 8/2014 | Thibadeau et al. | |
| 8,813,247 B1* | 8/2014 | Alten | G06F 21/31 |
| | | | 380/45 |
| 8,832,804 B1 | 9/2014 | Casey et al. | |
| 8,881,251 B1 | 11/2014 | Hilger | |
| 8,918,851 B1 | 12/2014 | Iannamico | |
| 2002/0029341 A1 | 3/2002 | Juels et al. | |
| 2002/0080123 A1 | 6/2002 | Kennedy et al. | |
| 2002/0196274 A1 | 12/2002 | Comfort et al. | |
| 2003/0147536 A1* | 8/2003 | Andivahis | H04L 63/06 |
| | | | 380/277 |
| 2004/0010721 A1 | 1/2004 | Kirovski et al. | |
| 2004/0030934 A1 | 2/2004 | Mizoguchi et al. | |
| 2004/0034801 A1 | 2/2004 | Jaeger | |
| 2004/0073809 A1 | 4/2004 | Wing Keong | |
| 2004/0095384 A1 | 5/2004 | Avni et al. | |
| 2004/0230843 A1 | 11/2004 | Jansen | |
| 2006/0206717 A1 | 9/2006 | Holt et al. | |
| 2006/0244735 A1 | 11/2006 | Wilson | |
| 2007/0005962 A1* | 1/2007 | Baker | G06Q 20/02 |
| | | | 713/168 |
| 2007/0067631 A1 | 3/2007 | Westhoff | |
| 2007/0097096 A1 | 5/2007 | Rosenberg | |
| 2007/0150842 A1 | 6/2007 | Chaudhri et al. | |
| 2007/0229216 A1 | 10/2007 | Yasuda | |
| 2008/0010678 A1 | 1/2008 | Burdette et al. | |
| 2008/0022129 A1* | 1/2008 | Durham | G06F 21/54 |
| | | | 713/189 |
| 2008/0163055 A1 | 7/2008 | Ganz et al. | |
| 2008/0263361 A1 | 10/2008 | Dutta et al. | |
| 2009/0089869 A1 | 4/2009 | Varghese | |
| 2009/0158424 A1 | 6/2009 | Yang | |
| 2009/0160800 A1 | 6/2009 | Liu et al. | |
| 2009/0199002 A1 | 8/2009 | Erickson | |
| 2009/0202153 A1 | 8/2009 | Cortopassi et al. | |
| 2009/0313693 A1 | 12/2009 | Rogers | |
| 2010/0043062 A1 | 2/2010 | Alexander et al. | |
| 2010/0146128 A1* | 6/2010 | Kulkarni | H04L 67/104 |
| | | | 709/228 |
| 2010/0169958 A1 | 7/2010 | Werner et al. | |
| 2010/0207721 A1 | 8/2010 | Nakajima et al. | |
| 2010/0223326 A1* | 9/2010 | Noldus | H04L 29/06027 |
| | | | 709/203 |
| 2011/0013031 A1 | 1/2011 | Miyasako | |
| 2011/0055585 A1 | 3/2011 | Lee | |
| 2011/0081640 A1 | 4/2011 | Tseng et al. | |
| 2011/0099203 A1* | 4/2011 | Fastring | G06F 17/30256 |
| | | | 707/783 |
| 2011/0191592 A1 | 8/2011 | Goertzen | |
| 2011/0197259 A1 | 8/2011 | Thibadeau et al. | |
| 2012/0005483 A1 | 1/2012 | Patvarczki et al. | |
| 2012/0084869 A1 | 4/2012 | Bilaney et al. | |
| 2012/0167199 A1 | 6/2012 | Riddiford | |
| 2012/0304284 A1 | 11/2012 | Johnson et al. | |
| 2013/0042303 A1 | 2/2013 | Chow et al. | |
| 2013/0043914 A1 | 2/2013 | Gelman | |
| 2013/0047236 A1 | 2/2013 | Singh | |
| 2013/0097697 A1 | 4/2013 | Zhu et al. | |
| 2013/0104197 A1 | 4/2013 | Nandakumar | |
| 2013/0111581 A1 | 5/2013 | Griffin et al. | |
| 2013/0179954 A1* | 7/2013 | Bidare | H04L 63/18 |
| | | | 726/7 |
| 2013/0201106 A1 | 8/2013 | Naccache | |
| 2013/0268775 A1 | 10/2013 | Hawkins | |
| 2014/0006512 A1* | 1/2014 | Huang | G06Q 30/02 |
| | | | 709/204 |
| 2014/0023279 A1 | 1/2014 | Fahn et al. | |
| 2014/0028554 A1 | 1/2014 | De Los Reyes et al. | |
| 2014/0181956 A1 | 6/2014 | Ahn et al. | |
| 2014/0233740 A1* | 8/2014 | Niamut | H04L 9/3013 |
| | | | 380/279 |
| 2014/0320420 A1 | 10/2014 | Ida et al. | |
| 2014/0331057 A1 | 11/2014 | Thibadeau et al. | |
| 2014/0359653 A1 | 12/2014 | Thorpe et al. | |
| 2014/0373132 A1 | 12/2014 | Basmov et al. | |
| 2015/0033306 A1 | 1/2015 | Dickenson et al. | |
| 2015/0138584 A1 | 5/2015 | Tsongas et al. | |
| 2015/0180902 A1* | 6/2015 | Biswas | H04L 63/20 |
| | | | 726/1 |
| 2015/0310188 A1* | 10/2015 | Ford | G06F 21/10 |
| | | | 726/28 |

FOREIGN PATENT DOCUMENTS

| | | |
|---|---|---|
| EP | 2085908 A2 | 8/2009 |
| EP | 2775416 A2 | 9/2014 |
| GB | 2504746 A | 2/2014 |
| RU | 2013113592 A | 10/2014 |
| WO | 03048909 A2 | 6/2003 |
| WO | 2009039223 A1 | 3/2009 |
| WO | 2011014878 A1 | 2/2011 |
| WO | 2011100017 A1 | 8/2011 |
| WO | 2013003535 A1 | 1/2013 |
| WO | 2014165431 A1 | 10/2014 |

OTHER PUBLICATIONS

Non-Final Office Action for U.S. Appl. No. 14/728,902, mailed Aug. 26, 2015, 15 pages.

Invitation to Pay Additional Fees and Partial International Search Report for PCT/US2015/033823, mailed Aug. 14, 2015, 7 pages.

International Search Report and Written Opinion for PCT/US2015/033830, mailed Aug. 24, 2015, 11 pages.

Non-Final Office Action for U.S. Appl. No. 14/330,986, mailed Sep. 15, 2015, 16 pages.

Non-Final Office Action for U.S. Appl. No. 14/728,759, mailed Sep. 10, 2015, 15 pages.

International Search Report and Written Opinion for PCT/US2015/033811, mailed Sep. 21, 2015, 10 pages.

International Search Report and Written Opinion for PCT/US2015/044694, mailed Oct. 2, 2015, 10 pages.

Author Unknown, "Cognitive test," Wikipedia.com, last modified Oct. 28, 2014, retrieved on Nov. 11, 2015, 3 pages, https://en.wikipedia.org/w/index.php?title=Cognitive_test&oldid=631463869.

Author Unknown, "James McKeen Cattell," Wikipedia.com, last modified Sep. 9, 2015, retrieved on Nov. 11, 2015, 5 pages, https://en.wikipedia.org/wiki/James_McKeen_Cattell.

Author Unknown, "Human Verification," graphicdesign.stackexchange.com, 1 page.

Author Unknown, "OpenID Authentication 2.0—Final," Openid.net, Dec. 5, 2007, retrieved on Jan. 1, 2013 from http://openid.net/specs/openid-authenication-2_0.html#http_encoding, 34 pages.

Author Unknown, "Security Assertion Markup Language (SAML) V2.0 Technical Overview," OASIS, Mar. 25, 2008, retrieved on Apr. 14, 2010 from http://docs.oasis-open.org/security/saml/Post2.0/sstc-saml-tech-overview.2.0-cd-02.pdf, 51 pages.

Beideman, Calvin et al., "Set Families with Low Pairwise Intersection," Apr. 17, 2014, retrieved Jan. 15, 2015 from http://www.cs.cmu.edu/~jblocki/, 12 pages.

Blocki, Jeremiah et al., "Adaptive Regret Minimization in Bounded-Memory Games," Decision and Game Theory for Security: Proceedings of the 4th International Conference on Decision and Game Theory for Security (GameSec), Nov. 11-12, 2013, Fort

(56) References Cited

OTHER PUBLICATIONS

Worth, TX, Springer International Publishing, pp. 65-84, retrieved Jan. 15, 2015 from http://www.cs.cmu.edu/~jblocki/, 19 pages.
Blocki, Jeremiah et al., "Adaptive Regret Minimization in Bounded-Memory Games," Presentation Slides, retrieved Jan. 15, 2015 from http://www.cs.cmu.edu/~jblocki/, 61 pages.
Blocki, Jeremiah et al., "Audit Games," Proceedings of the 23rd International Joint Conference on Artificial Intelligence, Aug. 3-9, 2013, Beijing, China, AAAI Press, pp. 41-47.
Blocki, Jeremiah et al., "Audit Games with Multiple Defender Resources," retrieved Jan. 15, 2015 from http://www.cs.cmu.edu/~jblocki/, 11 pages.
Blocki, Jeremiah et al., "Audit Mechanisms for Provable Risk Management and Accountable Data Governance," Decision and Game Theory for Security: Proceedings of the 3rd International Conference on Decision and Game Theory for Security (GameSec), Budapest, Hungary, Nov. 5-6, 2012, Springer Berlin Heidelberg, pp. 38-59, retrieved Jan. 15, 2015 from http://www.cs.cmu.edu/~jblocki/, 27 pages.
Blocki, Jeremiah et al., "Audit Mechanisms for Privacy Protection in Healthcare Environments," Proceedings of the 2nd USENIX Conference on Health Security and Privacy (HealthSec'11), Aug. 8-12, 2011, San Francisco, CA, USENIX Association, p. 10, retrieved Jan. 15, 2015 from http://www.cs.cmu.edu/~jblocki/, 2 pages.
Blocki, Jeremiah et al., "Differentially Private Data Analysis of Social Networks via Restricted Sensitivity," Proceedings of the 4th Conference on Innovations in Theoretical Computer Science (ITCS '13), Jan. 10-12, 2013, Berkely, CA, ACM, pp. 87-96, retrieved Jan. 15, 2015 from http://arxiv.org/abs/1208.4586v2, 19 pages.
Blocki, Jeremiah et al., "Differentially Private Data Analysis of Social Networks via Restricted Sensitivity," Presentation Slides, Fall 2012, retrieved Jan. 15, 2015 from http://www.cs.cmu.edu/~jblocki/, 94 pages.
Blocki, Jeremiah, "Senior Research Thesis: Direct Zero-Knowledge Proofs," May 1, 2009, retrieved Jan. 15, 2015 from http://www.cs.cmu.edu/~jblocki/, 16 pages.
Blocki, Jeremiah et al., "GOTCHA Password Hackers!" Proceedings of the 2013 ACM Workshop on Artificial Intelligence and Security (AISec '13), Nov. 4-8, 2013, Berlin, Germany, ACM, 12 pages.
Blocki, Jeremiah et al., "GOTCHA Password Hackers!" Presentation Slides, retrieved Jan. 15, 2015 from http://www.cs.cmu.edu/~jblocki/, 38 pages.
Blocki, Jeremiah et al., "Human Computable Passwords," Oct. 2, 2014, retrieved Jan. 15, 2015 from http://www.cs.cmu.edu/~jblocki/, 43 pages.
Blocki, Jeremiah et al., "Human Computable Passwords," Presentation Slides, Fall 2014, retrieved Jan. 15, 2015 from http://www.cs.cmu.edu/~jblocki/, 111 pages.
Blocki, Jeremiah et al., "The Johnson-Lindenstrauss Transform Itself Preserves Differential Privacy," Proceedings of the 2012 IEEE 53rd Annual Symposium on Foundations of Computer Science (FOCS), Oct. 20-23, 2012, New Brunswick, NJ, IEEE Computer Society, pp. 410-419, retrieved Jan. 15, 2015 from http://www.cs.cmu.edu/~jblocki/, 27 pages.
Blocki, Jeremiah et al., "Naturally Rehearsing Passwords," Advances in Cryptology—ASIACRYPT 2013: Proceedings of the 19th International Conference on the Theory and Application of Cryptology and Information Security, Part II, Bengalaru, India, Dec. 1-5, 2013 Springer Berlin Heidelberg, pp. 361-380, retrieved Jan. 15, 2015 from http://www.cs.cmu.edu/~jblocki/, 34 pages.
Blocki, Jeremiah et al., "Optimizing Password Composition Policies," Proceedings of the 14th ACM Conference on Electronic Commerce, Jun. 16-20, 2013, Philadelphia, PA, ACM, pp. 105-122, retrieved Jan. 15, 2015 from http://www.cs.cmu.edu/~jblocki/, 27 pages.
Blocki, Jeremiah, "Usable and Secure Password Management," Presentation Slides, Spring 2012, retrieved Jan. 15, 2015 from http://www.cs.cmu.edu/~jblocki/, 75 pages.
Blocki, Jeremiah et al., "Regret Minimizing Audits: A Learning-theoretic Basis for Privacy Protection," 2011 IEEE 24th Computer Security Foundations Symposium (CSF), Jun. 27-29, 2011, Cernay-la-Ville, France, IEEE, pp. 312-327, retrieved Jan. 15, 2015 from http://www.cs.cmu.edu/~jblocki/, 16 pages.
Blocki, Jeremiah et al., "Resolving the Complexity of Some Data Privacy Problems," Automata, Languages and Programming: Proceedings of the 37th International Colloquium Conference on Automata, Languages and Programming (ICALP 2010), Jul. 6-10, 2010, Bordeaux, France, Springer Berlin Heidelberg, pp. 393-404, retrieved Jan. 15, 2015 from http://www.cs.cmu.edu/~jblocki/, 18 pages.
Blocki, Jeremiah et al., "Resolving the Complexity of Some Data Privacy Problems," Presentation Slides, 2010, retrieved Jan. 15, 2015 from http://www.cs.cmu.edu/~jblocki/, 36 pages.
Blocki, Jeremiah et al., "Spaced Repetition and Mnemonics Enable Recall of Multiple Strong Passwords," Oct. 6, 2014, retrieved Jan. 15, 2015 from http://www.cs.cmu.edu/~jblocki/, 16 pages.
Blocki, Jeremiah, "Usable Human Authentication: A Quantitative Treatment," Doctoral Thesis, Jun. 30, 2014, retrieved Jan. 15, 2015 from http://www.cs.cmu.edu/~jblocki/, 262 pages.
Dunphy, Paul et al., "Do Background Images Improve "Draw a Secret" Graphical Passwords?" Proceedings of the 14th ACM Conference on Computer and Communications Security (CCS '07), Oct. 29-Nov. 2, 2007, Alexandria, Virginia, ACM, pp. 36-47.
Hughes, Neil, "Future iPhones, iPads could recognize, adjust for individual users," AppleInsider, Aug. 19, 2010, 4 pages, http://appleinsider.com/articles/10/08/19/future_iphones_ipads_could_recognize_adjust_for_individual_users.
Jansen et al., "Picture Password: A Visual Login Technique for Mobile Devices," National Institute of Standards and Technology, NISTIR 7030, Jul. 2003, 20 pages.
Pace, Zach, "Signing in with a picture password," http://blogs.msdn.com/b/b8/archive/2011/12/16/signing-in-with-a-picture-password.aspx, Dec. 16, 2011, 9 pages.
Scavo, T. et al., "Shibboleth Architecture," Jun. 8, 2005, retrieved on Jun. 20, 2014 from http:/open-systems.ufl.edu/files/draft-mace-shibboleth-tech-overview-latest.pdf, 31 pages.
Thibadeau et al., "Proofs of Knowledge on the Web: Framework for Password Identification and Capacity to Make Decisions," 2014-NIST-NSTIC-01 Abbreviated Proposal, Bright Plaza, Inc., Philadelphia, Mar. 2, 2014, 5 pages.
Zhao, Ziming et al., "On the Security of Picture Gesture Authentication," 22nd USENIX Security Symposium, Aug. 14-16, 2013, Washington, D.C., pp. 383-398.
International Search Report for PCT/US10/58825, mailed Feb. 2, 2011, 2 pages.
Written Opinion of the International Searching Authority for PCT/US10/58825, mailed Feb. 2, 2011, 4 pages.
International Preliminary Report on Patentability for PCT/US10/58825, mailed May 23, 2012, 3 pages.
International Search Report and Written Opinion for PCT/US2014/032342, mailed Jul. 4, 2014, 14 pages.
Written Opinion of the International Searching Authority for PCT/US2014/032342, mailed Mar. 17, 2015, 6 pages.
International Preliminary Report on Patentability for PCT/US2014/032342, mailed Jun. 24, 2015, 23 pages.
Extended European Search Report for European Patent Application No. 10845949.6, issued Oct. 9, 2014, 7 pages.
Non-Final Office Action for U.S. Appl. No. 12/884,478, mailed Dec. 12, 2012, 15 pages.
Final Office Action for U.S. Appl. No. 12/884,478, mailed May 20, 2013, 19 pages.
Advisory Action for U.S. Appl. No. 12/884,478, mailed Sep. 9, 2013, 3 pages.
Notice of Allowance and Examiner-Initiated Interview Summary for U.S. Appl. No. 12/884,478, mailed Apr. 4, 2014, 10 pages.
Non-Final Office Action for U.S. Appl. No. 14/330,986, mailed Dec. 16, 2014, 18 pages.
Final Office Action for U.S. Appl. No. 14/330,986, mailed Apr. 27, 2015, 20 pages.
Advisory Action and Examiner Initiated Interview for U.S. Appl. No. 14/330,986, mailed Jul. 14, 2015, 3 pages.

(56) References Cited

OTHER PUBLICATIONS

Invitation to Pay Additional Fees and Partial International Search Report for PCT/US2015/027040, mailed Jul. 24, 2015, 7 pages.
Notice of Allowance for U.S. Appl. No. 14/693,121, mailed Jan. 22, 2016, 7 pages.
Final Office Action for U.S. Appl. No. 14/728,902, mailed Jan. 29, 2016, 6 pages.
Non-Final Office Action for U.S. Appl. No. 14/728,904, mailed Jan. 25, 2016, 15 pages.
Final Office Action for U.S. Appl. No. 14/330,986, mailed Feb. 4, 2016, 18 pages.
Final Office Action for U.S. Appl. No. 14/728,759, mailed Feb. 1, 2016, 17 pages.
International Search Report and Written Opinion for PCT/US2015/027040, mailed Nov. 20, 2015, 21 pages.
International Search Report and Written Opinion for PCT/US2015/033823, mailed Dec. 2, 2015, 18 pages.
Advisory Action for U.S. Appl. No. 14/330,986, mailed May 2, 2016, 3 pages.
Notice of Allowance for U.S. Appl. No. 14/728,902, mailed Mar. 11, 2016, 7 pages.
International Search Report and Written Opinion for PCT/US2016/020670, mailed May 12, 2016, 11 pages.
Examination Report for European Patent Application No. 10845949.6, mailed Jun. 13, 2016, 6 pages.
Non-Final Office Action for U.S. Appl. No. 15/069,635, mailed Jun. 16, 2016, 6 pages.
Notice of Allowance for U.S. Appl. No. 14/728,904, mailed Jul. 1, 2016, 12 pages.
Menezes, A. et al., "Identification and Entity Authentication," Handbook of Applied Cryptography, CRC Press, 1997, pp. 385-424.
International Search Report and Written Opinion for PCT/US2016/033793, mailed Jul. 22, 2016, 11 pages.
Corrected Notice of Allowability for U.S. Appl. No. 14/728,904, mailed Aug. 10, 2016, 9 pages.
Non-Final Office Action for U.S. Appl. No. 14/728,759, mailed Jul. 26, 2016, 16 pages.

* cited by examiner

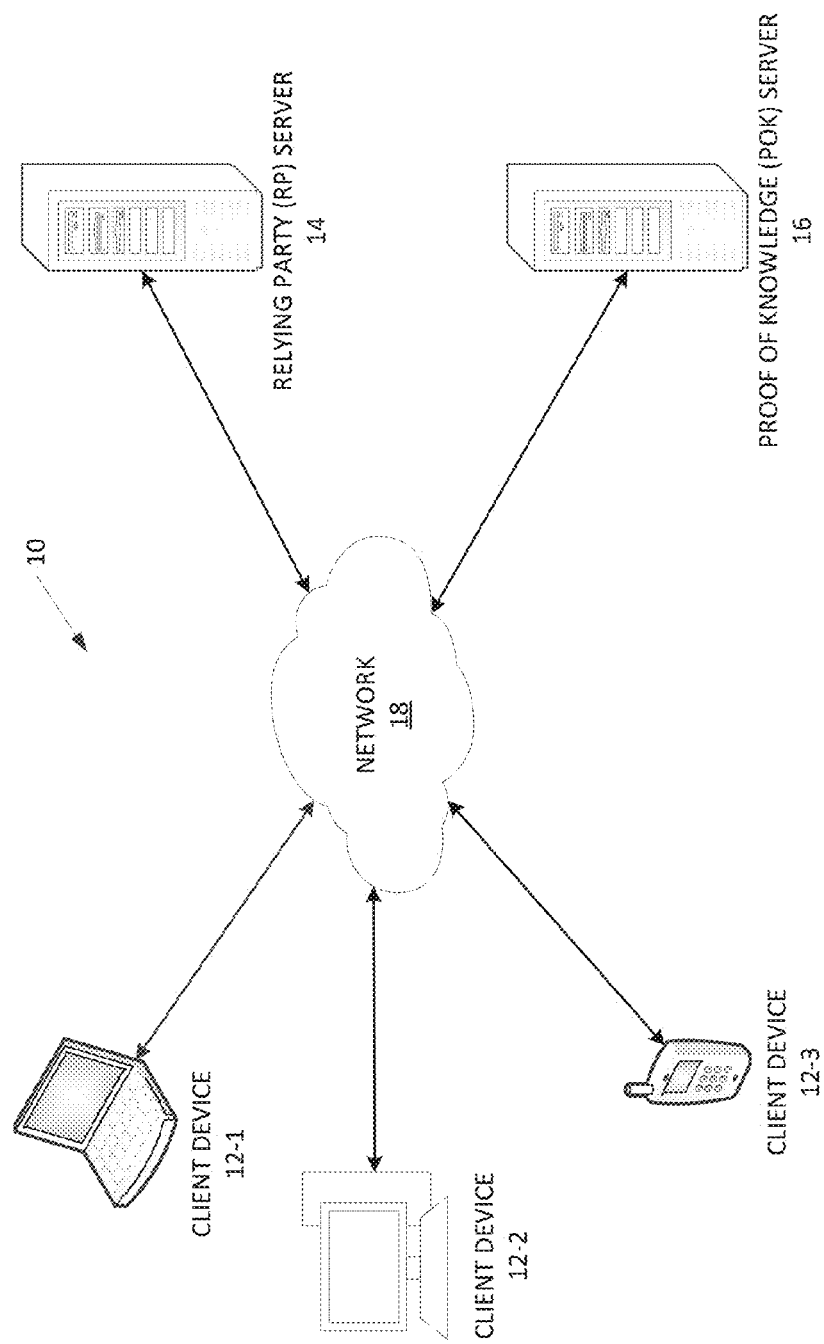

US 9,497,186 B2

METHODS AND SYSTEMS FOR SECURING PROOFS OF KNOWLEDGE FOR PRIVACY

RELATED APPLICATIONS

This application claims the benefit of provisional patent application Ser. No. 62/035,766, filed Aug. 11, 2014, the disclosure of which is hereby incorporated herein by reference in its entirety.

FIELD OF THE DISCLOSURE

The present disclosure relates generally to proofs of knowledge and, more particularly, to mechanisms that secure privacy for proofs of knowledge.

BACKGROUND

Authentication mechanisms include one or more authentication factors to control access to secured services. An authentication mechanism may require a knowledge factor (e.g., a username and a password), an ownership factor (e.g., a hardware security token), an inherence factor (e.g., a biometric identifier such as a fingerprint), or combinations thereof. The first of these is commonly referred to as Proof of Knowledge (PoK).

Authentication based on PoK includes a provisioning phase (e.g., enrollment) to define user knowledge, and a use phase to authenticate a user that proves that knowledge. The current paradigm for authentication based on PoK is the verification of an identity with a username and password. However, there are improved mechanisms for proofs of knowledge. One such improved mechanism involves the use of picture passwords that supplement or replace textual passwords, and prove that a user has knowledge of a combination of input actions together with a known image such as, for example, a still picture, a motion picture with or without sound, or a photograph. Another improved mechanism involves the use of cognitive tests, and prove that a user has a certain knowledge and/or cognitive ability. These improved mechanisms generally require two components for the PoK: (1) the test (e.g., the picture for the picture password, a cognitive testing question, etc.) and (2) the answer for the test (e.g., the input actions for the picture password, the answer to the cognitive testing question, etc.).

While PoK mechanisms are effective for authenticating users for access to secured services, they are not very secure or private. Typically, the entity controlling access to the secure services, i.e. the Relying Party (RP), has knowledge of all of the components required for the authentication, such as the username, password, picture, picture password, cognitive test, and answer to the cognitive test.

New systems have emerged to address the issue of security and privacy. One such system is taught in the commonly owned and assigned International Application No. PCT/US14/32342 entitled "METHOD AND SYSTEM OF PROVIDING A PICTURE PASSWORD PROOF OF KNOWLEDGE AS A WEB SERVICE," which is incorporated herein by reference in its entirety. The system disclosed therein uses a PoK service that is separate from that of a RP. The PoK service authenticates a user on behalf of the RP. In this system, the RP knows the username but not the password, and the PoK service knows the password but not the username. Security and privacy are improved by fragmenting the knowledge required for authentication between the PoK service and the RP. No single entity, except for the user, would possess sufficient knowledge to access secured services administered by the RP.

While these new systems that separate username and password improve security and privacy, the PoK service still has the knowledge required for authentication (e.g., the PoK test and corresponding answer) RP. This increases the risk that a third party can obtain and misuse the PoK testing information in a manner that is detrimental to the user. As such, a need exists to further improve the security and privacy in authentication mechanisms by ensuring that knowledge required for authentication (e.g., the PoK tests) remains private and unavailable to parties other than the user of a client device.

SUMMARY

Systems and methods disclosed herein relate to securing the privacy of knowledge used to authenticate a user (e.g., Proof of Knowledge (PoK) tests). In some embodiments, a client device includes a processor(s) and memory containing instructions executable by the processor(s) whereby the client device is operable to receive a first encryption key and user data comprising an encrypted test(s) from a PoK server. The client device also receives a second encryption key from a Relying Party (RP) server. The client device can decrypt the encrypted test(s) by using the first encryption key and the second encryption key to thereby render a decrypted test(s). The client device is further operable to obtain an answer(s) for the decrypted test(s), send a communication to the PoK server based on the answer(s), and receive a communication from the RP server that authorizes a user of the client device to access a service(s) administered by the RP server.

As such, the client device can encrypt and decrypt PoK information by using an encryption key that the client device generates according to a process that is known to the client device and which uses different encryption keys provided by the RP server and the PoK server. Neither the RP server nor the PoK server has access to all the encryption keys necessary to generate the encryption key used to secure the PoK. This reduces the risk that a third party could obtain the test(s) used for PoK and eventually the PoK itself (i.e., the answer(s) to the test(s)) to access the user's secured information. Moreover, this reduces the risk that sensitive PoK information (e.g., tests for cognitive testing) could be used in a manner that is detrimental to the user.

In some embodiments, a client device comprises one or more processors and memory containing instructions executable by the one or more processors. The client device is operable to receive a first encryption key and one or more encrypted tests from a PoK server, receive a second encryption key from a RP server, decrypt the one or more encrypted tests by using the first encryption key and the second encryption key to thereby render one or more decrypted tests, obtain one or more answers for the one or more decrypted tests, send a communication to the PoK server based on the one or more answers, and receive a communication from the RP server that authorizes a user of the client device to access one or more services administered by the RP server.

In some embodiments, in order to decrypt the one or more encrypted tests, the client device is further operable to generate a third encryption key from the first encryption key and the second encryption key, and decrypt the one or more encrypted tests by using the third encryption key to thereby render the one or more decrypted tests.

In some embodiments, the client device is further operable to encrypt the one or more answers by using the third encryption key, and wherein the communication sent to the PoK server comprises the one or more encrypted answers.

In some embodiments, the client device is further operable to create a cryptographic hash for the one or more answers, and wherein the communication sent to the PoK server comprises the cryptographic hash for the one or more answers.

In some embodiments, in order to generate the third encryption key, the client device is further operable to generate the third encryption key by performing one or more logical operations on the first encryption key and the second encryption key.

In some embodiments, the one or more logical operations are selected from a group consisting of: AND, OR, Exclusive OR (XOR), NOT, Not AND (NAND), Not OR (NOR), and Exclusive NOR (XNOR).

In some embodiments, in order to generate the third encryption key, the client device is further operable to generate the third encryption key by taking a split of the first encryption key and the second encryption key.

In some embodiments, taking the split of the first encryption key and the second encryption key comprises performing an XOR logical operation of the first encryption key and the second encryption key.

In some embodiments, the user data is formed as an encrypted Binary Large Object (BLOB).

In some embodiments, the encrypted BLOB comprises the one or more encrypted tests and one or more multimedia objects for the one or more encrypted tests.

In some embodiments, the one or more multimedia objects comprise an image for a picture password PoK.

In some embodiments, the one or more encrypted tests comprise one or more cognitive tests, and the one or more cognitive tests comprise the one or more multimedia objects.

Embodiments are also directed to a server computer providing a PoK service comprising one or more processors and memory containing instructions executable by the one or more processors. The server computer is operable to send a communication to a client device comprising a first encryption key and user data comprising one or more encrypted tests. The one or more encrypted tests are indecipherable to the server computer. The server computer is further operable to receive one or more encrypted answers obtained by the client device for the one or more encrypted tests. The one or more encrypted answers are indecipherable to the server computer. The server computer is further operable to compare the one or more encrypted answers for the one or more encrypted tests and pre-provisioned encrypted correct answers for the one or more encrypted tests.

In some embodiments, the one or more encrypted tests were encrypted with a combined key generated from the first encryption key and at least one other encryption key that is unknown to the server computer.

In some embodiments, the server computer is further operable to send one or more instructions to the RP server that control access by the user of the client device to one or more services administered by the RP server.

In some embodiments, the user data is formed as an encrypted Binary Large Object (BLOB), and at least one of the one or more encrypted tests comprise one or more encrypted multimedia objects.

In some embodiments, the one or more multimedia objects comprise an image for a picture password PoK test.

Embodiments are also directed to a RP server comprising one or more processors and memory containing instructions executable by the one or more processors. The RP server is operable to send a first encryption key to a client device and receive a communication from a PoK server indicating that the client device has been authenticated based on one or more encrypted tests that were encrypted using the first encryption key and at least one other encryption key that is unknown to the server computer.

In some embodiments, the RP server is further operable to receive a communication from the PoK server, the communication comprising one or more instructions for access control by the client device to one or more services administered by the RP server, and grant the client device access to the one or more services administered by the RP server in accordance with the one or more instructions provided by the PoK server.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIG. 1 illustrates a Proof of Knowledge (PoK) authentication system according to some embodiments of the present disclosure;

DETAILED DESCRIPTION

Figure 2A:
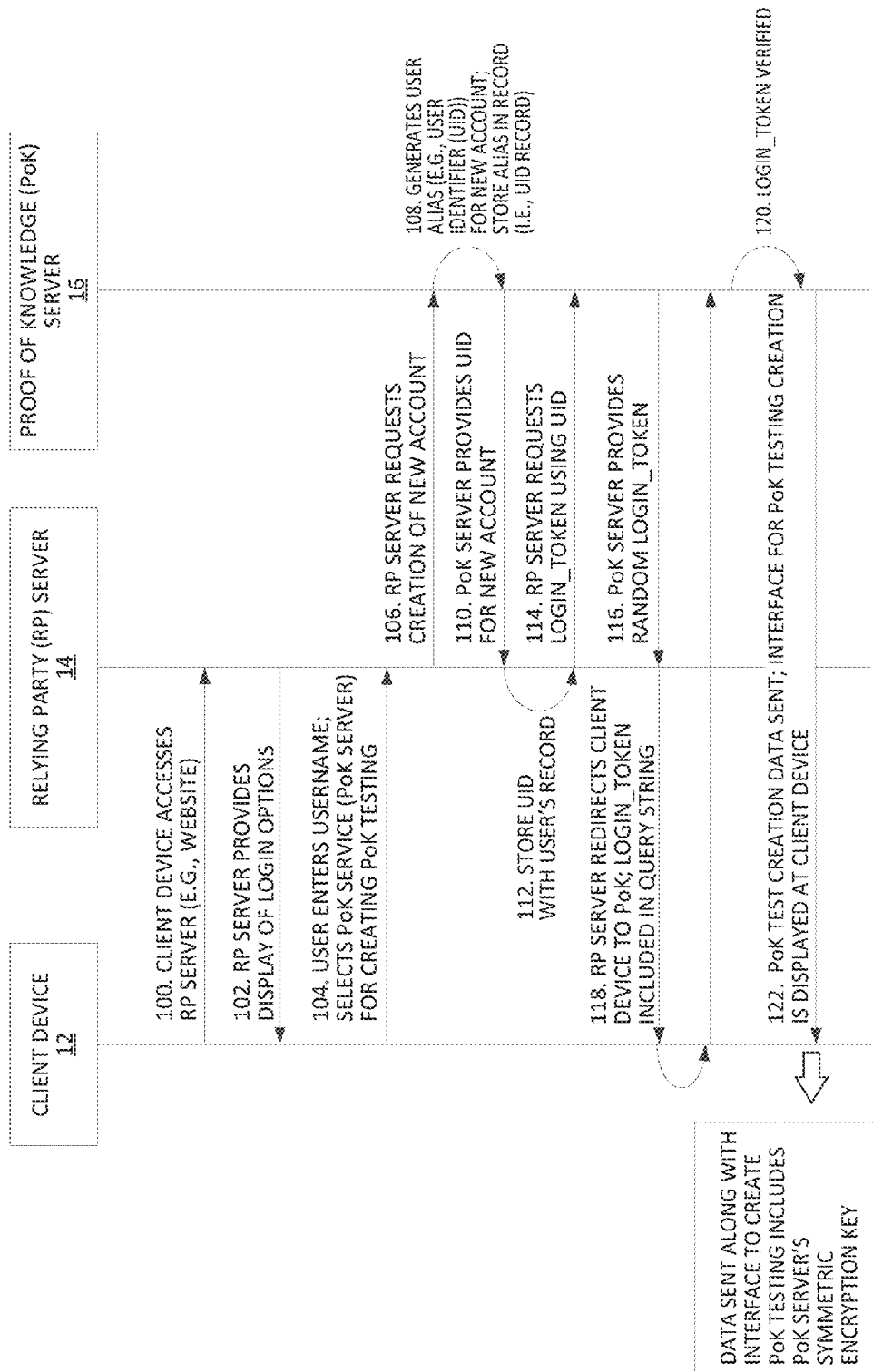
FIGS. 2A and 2B illustrate the operation of the PoK authentication system of FIG. 1 during provisioning of PoK testing according to some embodiments of the present disclosure.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

The purpose of terminology used herein is only for describing embodiments and is not intended to limit the disclosure.

As used herein, terms such as "first," "second," "third," and the like distinguish one element or embodiment from another but should not limit the element or embodiment. For example, an element can be termed a first element or a second element without departing from the scope of the present disclosure.

As used herein, the term "client device" refers to a device or apparatus that includes hardware and/or software that provides a web browser, a client application operable to communicate using client-server architecture, and/or a client application for retrieving, presenting, and communicating information over a network such as the Internet.

As used herein, the term "Relying Party (RP) server" refers to a device or apparatus that provides one or more services accessible by a client device via a network portal (e.g., a website). The services may include actions and/or information administered by a RP server in accordance with access controls that require authentication of an identity of a user operating the client device.

As used herein, the term "Proof of Knowledge (PoK) server" refers to a device or apparatus that includes hardware and/or software to provide a service (e.g., a password service) used to authenticate a user on behalf of the RP server, where the user is operating a client device.

As used herein, the term "Requesting Party (RQP)" refers to a party that requests a PoK service from the PoK server. As such, the RP server may also be referred to as a RQP server.

As used herein, the term "AJAX" refers to Asynchronous JAVASCRIPT and XML, any suitable communication technique used to send and receive data over the Internet from a server, comparable technologies that allow web applications to send data to and retrieve data from a server asynchronously (in the background) without interfering with the display and behavior of the existing page, or any suitable communication technique as understood by persons skilled in the art.

As used herein, the term "picture password" refers to using one or more known input actions associated with a known image to provide a password for access to secured information, and/or includes any suitable system or method for a PoK about an image that a user can readily remember. As used herein, an image may be, for example, a still picture, a motion picture with or without sound, or a photograph As used herein, the term "hash" refers to a cryptographic salted hash, a cryptographic salted hash function (e.g., National Institute of Standards and Technology (NIST) approved SHA256 Password Based Key Derivation Function (PBKDF)), and/or a derivation of enciphered or encoded data used to authenticate the integrity of corresponding information or actions with well-known anti-dictionary attack protections afforded by cryptographic salting. A hash may also include a number of hash iterations as suggested by NIST approved PBKDF.

Before describing embodiments of the present disclosure, a description of problems associated with the implementation of existing PoK mechanisms is beneficial.

Improved authentication systems separate the source of private information from the service that authenticates a user seeking to access that private information. For example, an RP server may administer secured services that are available to an authenticated user, and a PoK server may authenticate the user on behalf of the RP server. Authentication requires PoK that may include a user's identity, a picture password, and/or other testing used to assess the mental capacity of the user. The knowledge necessary to authenticate the user may be fragmented between the RP server, the PoK server, and the client device. For example, the RP server may have knowledge of the user's identity (e.g., username) but does not have knowledge of the PoK tests. On the other hand, the PoK server has knowledge of the PoK tests but does not have knowledge of the user's identity. Instead, the client device operated by the user could have access to all the knowledge necessary for authenticating that user.

In web login applications and other client-server applications that provide separate servers for the RP and the PoK, there is a need to insure the privacy of an individual user that is logging-in or otherwise being permitted access to RP server resources through a client device.

An example of a mechanism to insure the privacy of the individual user includes factoring a username from a password (whether the username is a text username or any form of token that identified the individual or group) from the PoK (whether the PoK is, without limitation, a text password, a text Personal Identification Number (PIN), or a picture password as disclosed in U.S. Pat. No. 8,813,183 entitled "METHOD AND SYSTEM FOR PROCESSOR OR WEB LOGON," which is incorporated herein by reference in its entirety). The RP server knows, or seeks to know, who the individual or group (the "user") is (commonly called the identity), while the PoK server knows, or seeks to know, if the individual (i.e., user), or individual(s) representing the group, has knowledge of a secret or other mental capability (typically, the password). As such, a user's identity may be defined by, for example, a username and/or password, and/or the identity may be shared by, and unique to, a group of users.

Commonly owned and assigned International Application No. PCT/US14/32342 discloses that the PoK server need not know the identity of the user to prove knowledge of the user. Furthermore, actual PoK may be revealed only at the client device. Therefore, the PoK server need not know the actual PoK, but can confirm that the user can perform the PoK correctly (e.g., based on a received cryptographic hash instead of the plaintext PoK).

Factoring separates the RP server's knowledge of who the user is, from the PoK server's knowledge of the PoK test, or mental challenge, used to assess the user. A PoK test may include any metric used to assess a user's knowledge or capacity, such as the mental capacity tests disclosed in U.S. application Ser. No. 14/728,759 entitled "ADVANCED PROOFS OF KNOWLEDGE FOR THE WEB," which is incorporated herein by reference in its entirety. Disclosed therein are PoK tests for proof of mental capacity. A user that does not successfully complete the PoK tests is determined to have diminished mental capacity. As a result, the PoK server sends instructions to the RP server to limit access by the user to services administered by the RP.

As used herein, a PoK test may be a cognitive test (see, e.g., en.wikipedia.org/wiki/Cognitive_test) or, equivalently, a mental test as originally distinguished by University of Pennsylvania psychologist James McKeen Cattell (see, e.g., en.wikipedia.org/wiki/James_McKeen_Cattell) (hereinafter "Cattell"). The PoK server provides a publishing platform for the vast majority of cognitive tests that have been developed since Cattell, and any future mental tests that may be conceived along this testing line of psychology and related disciplines. Use of cognitive testing can greatly decrease the risk of fraudulent logins and factoring can protect the user's private knowledge from discovery by the RP server, among other privacy concerns.

However, it remains that factoring and hashing methods still allow the PoK server to have knowledge of an actual PoK test or challenge. For example, in the case of a picture password, the PoK server knows the picture that may have been uploaded or selected by the user, or in the case of a text password, the PoK server knows that what is requested of the user is a text password (as opposed to, for example and without limitation, a picture password, a PIN, or other test that the client device is instructed to obtain). As such, the PoK server knows the content of the PoK test(s) (pictures, texts, etc.) that are used for authentication.

It would be desirable to have a method and system that permits even more assurance of user privacy. As such, the present disclosure includes embodiments that provide methods by which even the PoK server does not know the PoK test(s). In particular, the present disclosure includes embodiments where the PoK test is encrypted on the PoK server such that the PoK server cannot fully decrypt the PoK test to have knowledge of the test, and the test is equally unavailable to the RP server through a similar encryption mechanism and/or simply denied by access. Yet, the client device would have sufficient knowledge to be able to decrypt (or in the case of PoK test creation, encrypt) the PoK test(s).

The disclosed authentication mechanisms have broad applications as password PoKs to control access to device resources of all kinds. For example, embodiments of the present disclosure can protect against leakage of passwords and other PoKs that control such resources, and even the anonymity of the user and a test needed to release access to a secured resource. One such non-limiting example of a physical resource on a local client machine that can be protected in this way is a "self-encrypting drive" (see, e.g., en.wikipedia.org/wiki/Hardware-based_full_disk_encryption).

There are many ways to ensure privacy of PoK tests if the user always uses exactly the same instance of a client. For example, if the user always uses the same machine and the same browser, a cookie (e.g., a small piece of data sent from a website and stored in a user's web browser for use while the user is browsing the website) can hold a secret encryption key. However, if the user can appear from any compatible client device (e.g., without limitation any machine whether desktop or mobile phone) or any client software (e.g., without limitation any Hypertext Transfer Protocol Secure (HTTPS) browser), then the problem becomes more difficult. If an additional requirement is that the encryption must be completely invisible (transparent) to the user at all times while nevertheless providing the desired privacy protections, then a solution to the problem is even more difficult.

Some embodiments of the present disclosure solve these problems by noting that the RP server and the PoK server share an anonymous token unique to a user identity known by the unique relying party (as disclosed in the aforementioned PCT/US14/32342, e.g., the anonymous token may include a large random number that is unique to the RP server for a particular user. Further, the anonymous token may be generated in response to a request from the RP server to the PoK server, in a manner that is invisible to the user). As detailed below, in some embodiments, the RP server also generates a symmetric encryption key and the PoK server also generates another symmetric encryption key for this unique user-relying-party pair. These keys are not shared between the two servers.

Rather, the PoK key is provided when an encrypted Binary Large Object (BLOB) containing the test is provided to the client device. The client device may then be instructed to directly (HTTPS) obtain the RP server key and take the split (e.g., Exclusive OR (XOR) the two keys) to create an Effective encryption Key (EK). This EK can then successfully encrypt or decrypt the PoK test(s) at the client device.

The request to the RP server for the symmetric encryption key (used for the split process) may be a one time, time limited request with a session key secret that is shared in this session between the RP server and the PoK server. This further insures that other parties cannot obtain the RP's key, even if they learn the anonymous user token.

As such, the present disclosure solves the aforementioned problems by providing systems and methods that secure the PoK used to authenticate a user (e.g., PoK tests). In some embodiments, a client device includes processor(s) and memory containing instructions executable by the processor(s) whereby the client device is operable to receive a first encryption key and encrypted test(s) from a PoK server. The client device also receives a second encryption key from a RP server. The client device can decrypt the encrypted test(s) by using the first encryption key and the second encryption key to thereby render decrypted test(s). The client device is further operable to obtain answer(s) for the decrypted test(s), send a communication to the PoK server based on the answer(s), and receive a communication from the RP server that authorizes a user of the client device to access service(s) administered by the RP server.

Accordingly, even the PoK server does not know the PoK test(s) used to authenticate a user on behalf of the RP server. Instead, the client device encrypts and decrypts PoK test(s) by using an encryption key that the client device generates according to a process that is known to the client device and which uses different encryption keys provided by the RP and the PoK servers. Neither the RP server nor the PoK server have access to all the encryption keys necessary to generate the encryption key used to secure the PoK test(s). Moreover, neither the RP server nor the PoK server knows the process for generating the encryption key used to encrypt and decrypt the PoK test(s).

Limiting the exposure of sensitive and private information used to authenticate a user has several benefits. First, the disclosed embodiments reduce the risk of an insider attack or external hacking of the PoK server that would reveal the PoK tests used to authenticate users. It is particularly easy to see the risk of revealing the private contents of a PoK test by anyone with access to the PoK server that could obtain and use those private contents in an unauthorized manner. As such, the disclosed embodiments reduce the risk that the PoK server or a third party could misuse the private content of PoK testing.

Second, the disclosed embodiments reduce the risk that sensitive information used for PoK testing (e.g., cognitive testing) could be used in a manner that is detrimental to the user. For example, the disclosed embodiments prevent unauthorized use of cognitive testing for purposes other than to authenticate users on behalf of a RP server. Such methods prevent anyone with authorized or unauthorized access to the PoK server to assess the cognitive abilities (e.g., mental capacity) of users for unauthorized purposes and/or in a manner that is detrimental to users. As such, the disclosed embodiments reduce the risk that cognitive testing could be used for purposes other than to authenticate users.

In some embodiments, the PoK tests are encrypted to prevent the PoK server from viewing the unencrypted PoK tests. Moreover, the PoK server does not have access to an encryption key that could decrypt the PoK tests. The RP server similarly lacks the ability to view the unencrypted PoK tests. Moreover, the RP server may also be denied any access to the PoK tests altogether. Yet the client device would have the encryption key to decrypt the encrypted PoK test, and the user of the client device would have the knowledge to provide correct answers for the PoK tests. Moreover, the client device would have the ability to encrypt one or more PoK tests in the case of creating PoK tests.

Thus, the private and sensitive information used to authenticate a user is securely isolated to the client device, as detailed below.

FIG. 1 illustrates a PoK authentication system 10 according to some embodiments of the present disclosure. The PoK authentication system 10 (hereinafter sometimes referred to as the "system 10") may include a combination of one or more servers and/or one or more client devices. As shown, the system 10 includes client devices 12-1, 12-2, and 12-3 (generally referred to herein collectively as client devices 12 and individually as client device 12), a RQP/RP server 14 (hereafter referred to as the RP server 14), and a PoK server 16, all interconnected via a network 18 (e.g., the Internet). In this example, the client devices 12 include a laptop computer 12-1, a desktop computer 12-2, and a mobile device 12-3. However, these are only examples. The client devices 12 can be any suitable type of device that can be operated by a user to access the RP server 14.

In some embodiments, the RP server 14 and/or the PoK server 16 can provide respective services that use one or more distributed servers that are remote from the client devices 12. In some embodiments, the RP server 14 and the PoK server 16 are components of a service and communicate over a channel separate from the network 18. For example, the client devices 12 may communicate with the RP and PoK servers 14 and 16 over the Internet, but the RP and PoK servers 14 and 16 may communicate with each other over a separate network.

The RP server 14 provides a portal over the network 18 to display an interface at the client device 12. The portal may include a website, and the network 18 may include the Internet. The RP server 14 administers secured services (e.g., including private information) that can be accessed by a user via the website rendered on the client device 12. However, the portal provided by the RP server 14 is not limited thereto. For example, the RP server 14 may provide a downloadable application (e.g., an "app") designed specifically to access the secured services over the network 18. For example, the RP server 14 may correspond to a server operated by a financial institution that administers account information for users to access over the Internet. However, the disclosed embodiments are not limited to this particular example.

The PoK server 16 may operate to authenticate users of the client devices 12 over the network 18 on behalf of the RP server 14. The process performed by the PoK server 16 to authenticate a user is referred to herein as a process of "PoK testing." PoK testing may include issuing PoK tests, receiving corresponding answers, rendering results based on the answers, and providing access control instructions to the RP server 14 based on the results.

The PoK server 16 provides one or more encrypted PoK tests over the network 18 to the client device 12. The PoK server 16 also provides one or more encryption keys (hereafter referred to as the "first encryption keys") over the network 18 to the client device 12. The first encryption key is unique for each user seeking to access secured services administered by a unique RP such as the RP server 14. Thus, if the PoK server is used by the same user in the access of secured services administered by two different RP servers, then the PoK server may have two unique first encryption keys, one for each of the two different RP servers. The RP server 14 does not have access to any of the first encryption keys for each user of client devices 12. Instead, the PoK server 16 and the client devices 12 have access to any first encryption keys.

The RP server 14 also provides one or more encryption keys (hereafter referred to as the "second encryption keys") over the network 18 to the client device 12. Similar to the first encryption key, the second encryption key is unique for each combination of a user and a RP. The PoK server 16 does not have access to any of the second encryption keys for each user of the client devices 12. Instead, the RP server 14 and the client devices 12 have access to any second encryption keys. As such, a particular client device 12 has access to both a first encryption key and a second encryption key for a particular user seeking to access a particular RP with that client device 12.

In some embodiments, the first and second encryption keys may be "symmetric" encryption keys because they are used to both decrypt and encrypt data at the client devices 12. However, in some embodiments, the first and second encryption keys are not symmetric. For example, the client devices 12 may encrypt data using the first and second encryption keys but decrypt the same data using encryption keys other than the first and second encryption keys, such as private keys in a public-private key cryptography.

The PoK test(s) may be decrypted at the client device 12 with an EK that is generated at the client device 12 from the first and second encryption keys. However, the first and second encryption keys cannot individually be used to decrypt the PoK test(s). Instead, the EK is generated from the first and second encryption keys according to a process that is known to the client device 12. As such, the RP server 14 and the PoK server 16 do not have access to the EK and knowledge about how the EK is generated. Thus, the client device 12 has access to the combination of the first encryption key, the second encryption key, and the EK, and has knowledge of the process for generating the EK from the first and second encryption keys.

In some embodiments, the process for generating the EK may include a process that combines the first and second encryption keys in a unique way. In some embodiments, at least a portion of the first encryption key and at least a portion of the second encryption key may be combined to form the EK. For example, the client device 12 may take a "split" of the first and second encryption keys to generate the EK. As such, the first and second encryption keys are each a "split key." Two or more split keys are added together in some fashion to generate the effective key such that any one split key does not have the ability to determine what the other split keys are. In other words, any split key cannot derive any other split key that is used to generate the EK.

In some embodiments, the first and second encryption keys (e.g., component keys) may have an equivalent cryptographic strength, and their combination may create an EK that has a cryptographic strength that is different from the first and second encryption keys. For example, adding two 16 bit split keys could create a 32 bit EK.

In some embodiments, the first and second encryption keys are processed to generate the EK according to one or more logical operations. The logical operation(s) may be selected by the client device 12 from a group consisting of AND, OR, XOR, NOT, Not AND (NAND), Not OR (NOR), and Exclusive NOR (XNOR).

For example, the client device 12 may take a split of the first and second encryption keys by performing a bitwise XOR logical operation of the first and second encryption keys to generate the EK. Processing the first and second encryption keys according to an XOR operation renders an EK that has the same cryptographic strength as the individual split keys (i.e., the first and second encryption keys). However, generation of the EK is not limited thereto.

The EK grants the client device 12 the ability to decrypt the PoK test(s). In some embodiments, the EK is symmetric such that decryption and encryption of the PoK test(s) is performed at the client device 12 with the same EK. As such, the RP server 14 and the PoK server 16 are unable to generate the EK because each server does not know the other server's encryption key and how the client device 12 combines both keys to generate the EK, which is required to decrypt the encrypted PoK test(s).

For example, the PoK server 16 may provide the client device 12 user data that includes the first encryption key and an encrypted binary large object (BLOB) that contains the PoK test(s). A BLOB, as referred to herein, is a collection of binary data stored as a single entity in a database management system. The BLOB may include multimedia objects such as images or audio, and/or may include binary executable code. For example, the BLOB may include a picture for a picture password PoK test. Note that the BLOB is only an example. Any suitable data structure(s) can be used.

The client device 12 may then directly request (via HTTPS) the second encryption key from the RP server 14 and, for example, take the split (e.g., XOR the two encryption keys) to create the EK. The EK can then be used to successfully decrypt the BLOB including the PoK test(s).

In some embodiments, the request to the RP server 14 for the second encryption key may be a one time, time limited, request with a session key secret that is shared in a session between the RP server 14 and the PoK server 16. This ensures that other parties cannot obtain the second encryption key even if the other parties learn of an anonymous user token used to establish a session between the client device 12 and the PoK server 16.

The user of the client device 12 is authenticated to access the secured services administered by the RP server 14 via the website by providing correct answers for the PoK test(s). In some embodiments, the client device 12 may use the EK to subsequently encrypt one or more corresponding answers for the decrypted PoK test(s). In some embodiments, the client device 12 may process the answer(s) to generate a cryptographic hash of the answer(s) without using the EK. The encrypted answer(s) (or cryptographic hash) are then sent to the PoK server 16, which uses the encrypted answer(s) (or cryptographic hash) to obtain results for authenticating a user based on the PoK test(s).

The PoK server 16 receives the encrypted answer(s) (or cryptographic hash) for the PoK test(s) over the network 18 from the client device 12. The PoK server 16 cannot decrypt the encrypted answer(s) because it does not have access to the EK and/or cannot decipher the cryptographic hash of the answer(s). The PoK server 16 compares the encrypted answer(s) (or cryptographic hash) against hash values that represent "correct" answer(s) to determine results of the PoK testing. For example, the PoK server 16 can compare the encrypted answer(s) received from the client device 12 and the hash values stored at the PoK server 16. A match may be indicative of a correct answer whereas a mismatch may be indicative of an incorrect answer. Validation of the encrypted answer(s) by the PoK server 16 authenticates the user of client device 12.

The results of the PoK testing may include instructions issued by the PoK server 16 that define actions to be taken by the RP server 14 in the event that the user does not pass one or more of the PoK tests. The user of the client device 12 may then obtain access to the secured information administered by the RP server 14 due to the instructions provided to the RP server 14 by the PoK server 16, after authenticating the user. In some embodiments, the instructions may cause the RP server 14 to restrict access to secured services when the PoK server 16 determines that a user has diminished mental capacity.

Accordingly, sensitive information used to authenticate a user via PoK testing remains private. Specifically, the encrypted PoK test(s) and corresponding encrypted answer(s) are indecipherable to both the PoK server 16 and the RP server 14 because neither server knows both the first and second encryption keys nor how these keys are used to generate the EK. The term "indecipherable" refers to any form of information that is incapable of being deciphered without a suitable encryption key and/or the process for decrypting. As such, indecipherable information cannot be read or understood without an encryption key to, for example, prevent unauthorized access. Accordingly, the PoK test(s) and corresponding answer(s) cannot be used for unauthorized purposes. For example, the sensitive information used for cognitive testing cannot be used in an unauthorized manner because it is indecipherable to everyone except the user of the client device 12 that has obtained the correct keys to decrypt and knows how to use the keys to decrypt.

Instead, the RP server 14 and the PoK server 16 will only have abstract knowledge of the PoK testing, such as a level of access that the RP server 14 should grant an authenticated user based on encrypted answers provided by the user of the client device 12 in response to encrypted PoK tests provided by the PoK server 16. The encrypted answers and encrypted PoK tests remain indecipherable to anyone other than the client device 12. Thus, the PoK server 16 and the RP server 14, either alone or combined, have insufficient knowledge of a user's private information to enable its misuse.

Figure 2B:
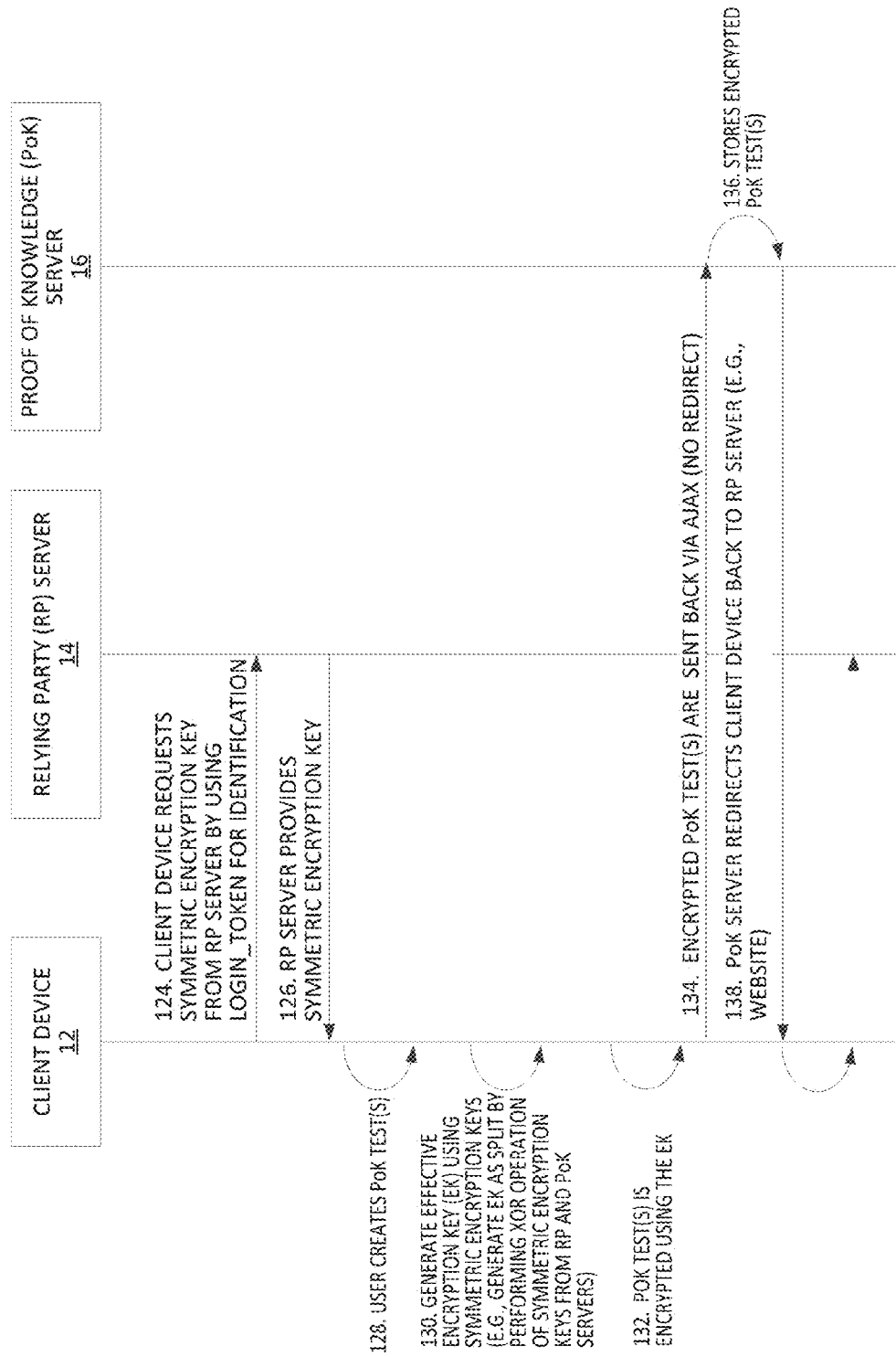
Figure 3A:
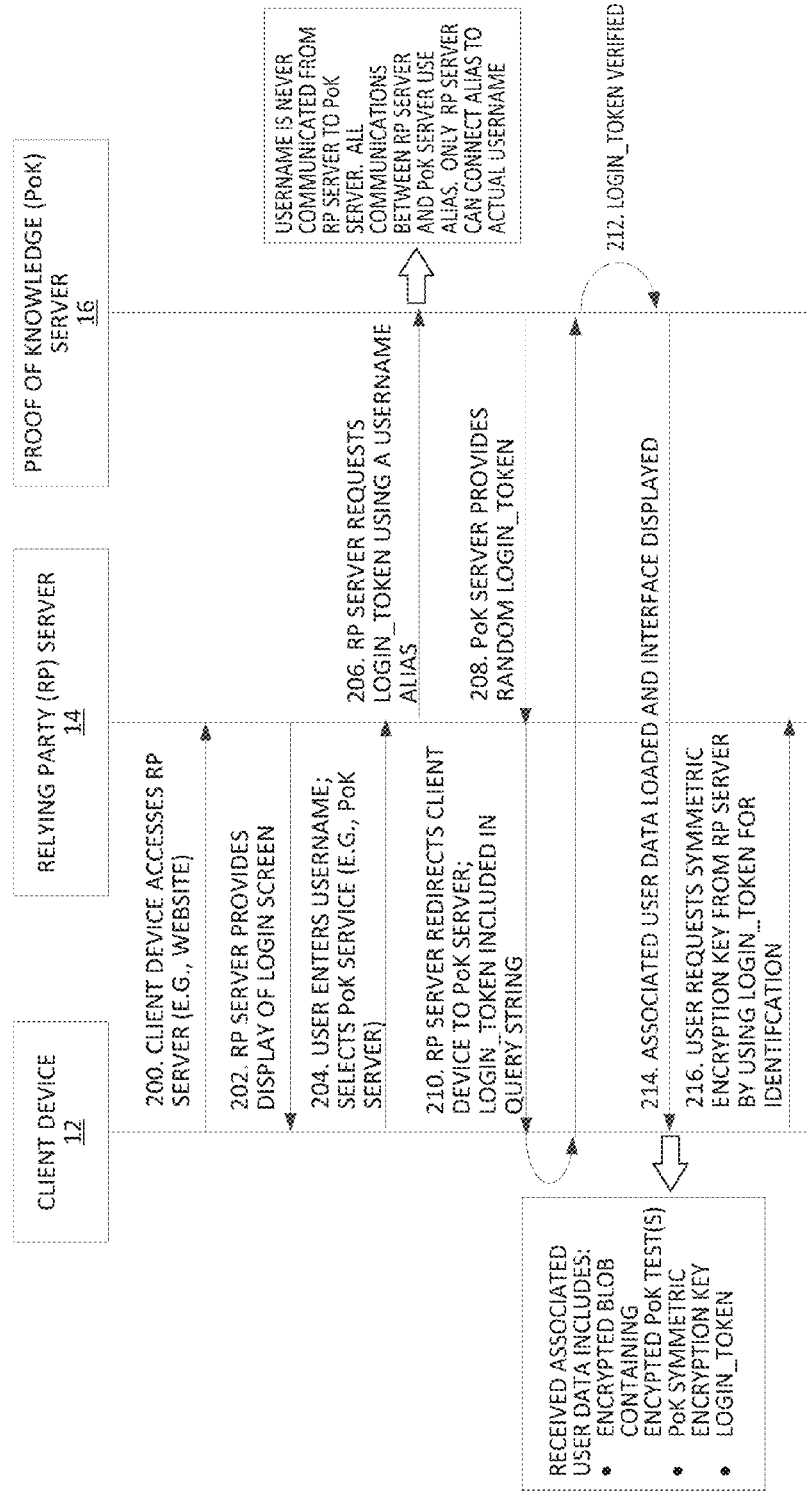
FIGS. 3A and 3B illustrate the operation of the PoK authentication system of FIG. 1 during use of the PoK testing provisioned in FIGS. 2A and 2B according to some embodiments of the present disclosure.
Figure 3B:
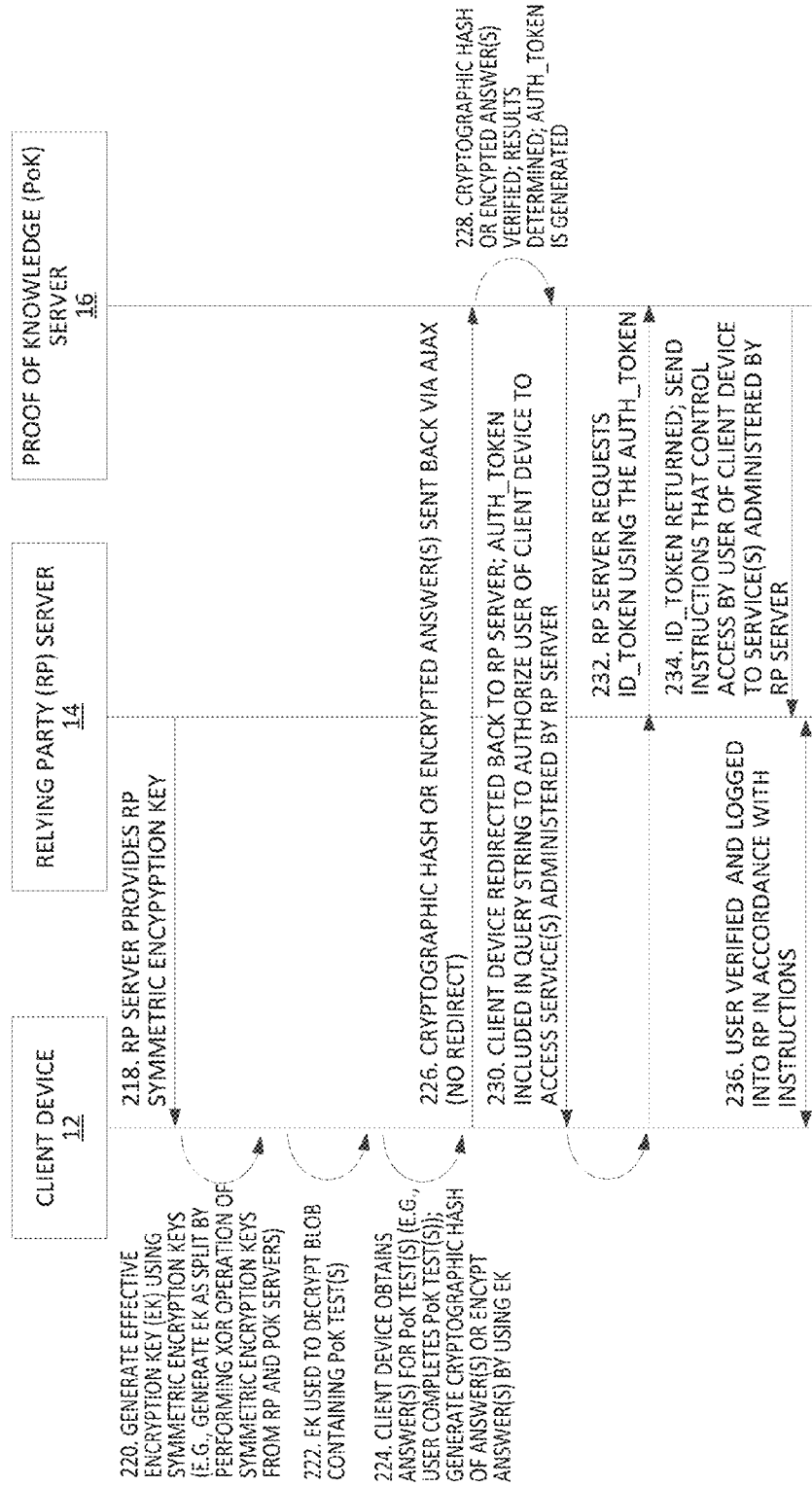
Figure 4:
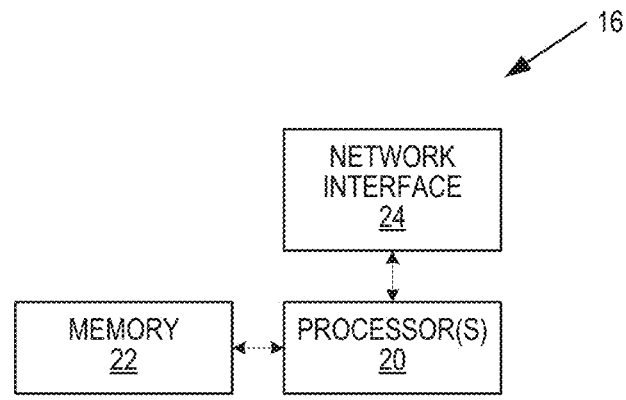
FIG. 4 is a block diagram of a server computer for a PoK service according to some embodiments of the present disclosure.
Figure 5:
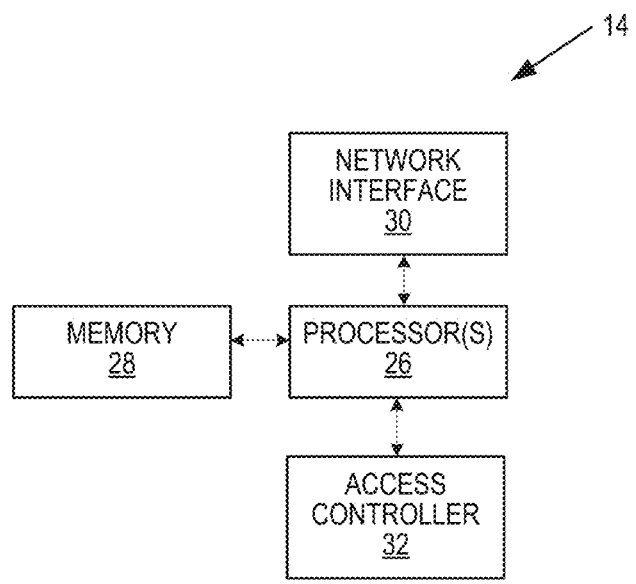
FIG. 5 is a block diagram of a Relying Party (RP) server according to some embodiments of the present disclosure.
Figure 6:
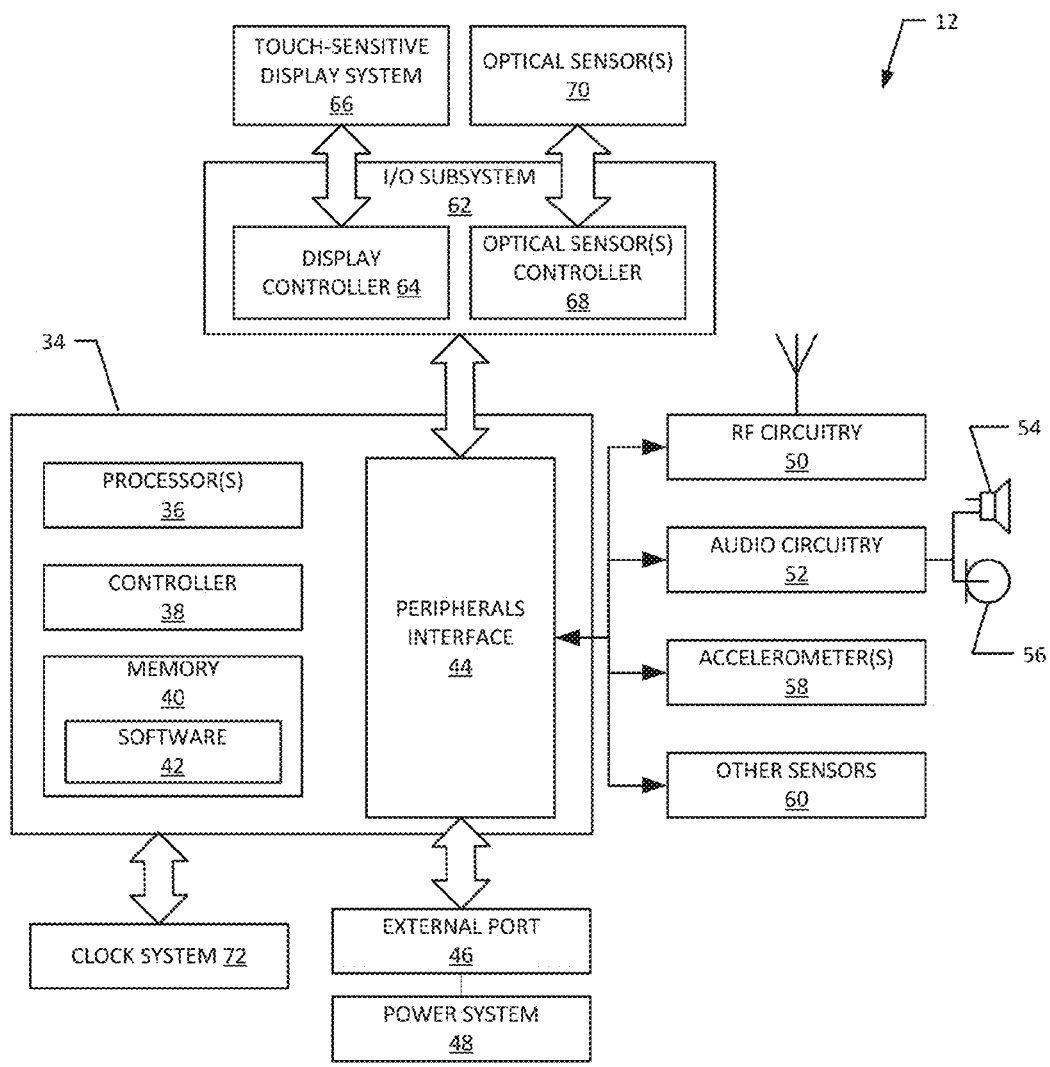
FIG. 6 is a block diagram of a client device according to some embodiments of the present disclosure.

The system 10 performs processes for provisioning and utilizing the PoK testing as detailed below. Specifically, FIGS. 2A and 2B show a diagram that illustrates a process for provisioning the PoK testing. FIGS. 3A and 3B show a diagram that illustrates a process for using the provisioned PoK testing. Lastly, FIGS. 4, 5, and 6 are block diagrams of the PoK server 16, the RP server 14, and the client device 12, respectively.

FIGS. 2A and 2B show a diagram that illustrates provisioning of PoK testing according to some embodiments of the present disclosure. As shown, a client device 12, in response to input received at the client device 12, accesses a network portal (e.g., a website) administered by the RP server 14 to provision (i.e., setup) PoK testing for accessing one or more services provided by the RP server 14 (step 100). In response, the RP server 14 provides an interface that displays login options (step 102). In some embodiments, the interface enables the user to register a username to establish a new account. In some embodiments, the interface also enables the user to register an initial password associated with the username. In these embodiments, for example, the PoK server 16 establishes cognitive testing on behalf of the RP server 14, which handles authentication of the username and initial password. The user enters the username (and the optional initial password) and may select a PoK service to create PoK testing for the new account (step 104).

The RP server 14 then sends a request to the PoK server 16 to create a new account that includes PoK testing (step 106). The request does not include information that reveals the identity of the user, which maintains the anonymity of the user at the PoK server 16. The PoK server 16 generates a User Identifier (UID) for the new account and stores the UID in a new record (i.e., the UID record) that may be stored in a database of UID records (step 108). As such, the new account for the user is created at the PoK server 16. The UID can subsequently be used as an alias for the user when communicating with the PoK server 16. The PoK server 16 returns the UID to the RP server 14 (step 110). The RP server 14 stores the UID in a record for the user (step 112). As such, the new account for the user is created at the RP server 14.

The RP server 14 uses the UID to request a login_token from the PoK server 16 (step 114). In response, the PoK server 16 then returns a random login_token to the RP server 14 (step 116). The RP server 14 provides the login_token in a query string to the client device 12, and redirects the client device 12 to a portal administered by the PoK server 16 (step 118).

The PoK server 16 then verifies the login_token received by the RP server 14 (step 120). Upon verification of the login_token, the PoK server 16 provides an interface for display at the client device 12 (step 122). The PoK server 16 also provides data used in conjunction with the displayed interface to enable the user of the client device 12 to create one or more PoK tests in step 122. In some embodiments, the data sent to the client device 12 may include the symmetric encryption key of the PoK server 16 (i.e., the first encryption key).

The client device 12 then requests the symmetric encryption key of the RP server 14 (e.g., the second encryption key) by using the login_token (step 124). The RP server 14 responds by providing its symmetric encryption key to the client device 12 (step 126). The user of the client device 12 can then use the interface provided by the PoK server 16 to create one or more PoK tests according to a variety of processes (step 128) as detailed above.

As indicated above, the PoK tests may include, for example, a picture for a picture password or cognitive tests used to assess the mental capacity or unique knowledge of the user. As such, the user may be prompted to upload or select a picture for the picture password. The user is then prompted to enter a sequence of input actions for the picture password that corresponds to the "correct answers" to the picture password test. The combination of the picture and input action sequence may be temporarily saved locally at the client device 12 as an unencrypted picture password that defines a PoK test and corresponding answers, respectively.

The user may define PoK testing to include cognitive tests by selecting one or more predefined tests, selecting conditions for activating the tests, providing correct answers for the tests, and designating actions to be taken by the RP server 14 in the event that the user fails to provide correct answers during PoK testing. During this initial provisioning process, the tests, conditions, and actions may be temporarily saved locally at the client device 12 as unencrypted cognitive tests that define the PoK tests. Any and/or all of the unencrypted tests, conditions, and/or actions are discarded after the PoK testing has been provisioned. In other words, the unencrypted PoK testing information is not retained in memory after being provisioned. Details of the process for creating cognitive tests are omitted here for brevity. However, the interested reader may refer to U.S. application Ser. No. 14/728,759, which has been incorporated by reference, for details about the process to create the mental capacity tests.

The client device 12 generates the EK using the first encryption key and the second encryption key (step 130). For example, the client device 12 may take the split of both encryption keys by transforming the encryption keys according to a bitwise XOR logical operation. The client device 12 then uses the EK to encrypt the PoK tests stored locally at the client device 12 to thereby generate encrypted PoK tests (step 132). The client device 12 then sends the encrypted PoK tests to the PoK server 16 via AJAX without a redirect (step 134). The PoK server 16 stores the encrypted PoK tests in association with the UID record for subsequent use to authenticate the user (step 136). The PoK server 16 then redirects the client device 12 back to the website of the RP server 14 (step 138).

FIGS. 3A and 3B show a diagram that illustrates a process for utilizing the PoK testing provisioned in FIGS. 2A and 2B according to some embodiments of the present disclosure. As shown, a user operating the client device 12 accesses a network portal (e.g., website) administered by the RP server 14 over the network 18 to request access to one or more secured services (step 200). For example, the secured services may include providing access to private information such as financial information available via the website. In response, the RP server 14 provides an interface that displays a login screen (step 202). The user then enters a username (and the optional initial password) used to identify the user and select the PoK service to authenticate the user (step 204). In some embodiments, the user enters the username alone to identify the user (without an initial password), and selects the PoK service to authenticate the user. The RP server 14 then requests a login_token from the PoK server 16 using the UID (step 206). The UID represents an alias for the user because the actual username is never communicated to the PoK server 16. Instead, all communications between the RP server 14 and the PoK server 16 use the alias to maintain the user's anonymity. Only the RP server 14 has knowledge of the username (and in some embodiments, the initial password) used to identify the user.

The PoK server 16 returns a random login_token to the RP server 14 (step 208). The RP server 14 then communicates the login_token in a query string to the client device 12 and redirects the client device 12 to the PoK server 16 (step 210). The PoK server 16 then verifies the random login_token (step 212). Upon successfully verifying the random login_token, the PoK server 16 provides an interface and the data associated with the user for loading by the client device 12 (step 214).

In some embodiments, the data associated with the user may include a BLOB that includes the encrypted PoK tests defined according to the process shown in FIGS. 2A and 2B. The data associated with the user may also include the symmetric encryption key of the PoK server 16 (i.e., the first encryption key) and the login_token. The client device 12 uses the login_token to request the symmetric encryption key of the RP server 14 (i.e., the second encryption key) (step 216). In response, the RP server 14 provides the second encryption key to the client device 12 (step 218).

The client device 12 then generates the EK by using the first and second encryption keys provided separately by the PoK server 16 and the RP server 14, respectively (step 220). As detailed above, the EK may be generated according to a variety of processes. As shown, the client device 12 takes the split of both encryption keys transforming the encryption keys according to a bitwise XOR logic operation. The client device 12 uses the EK to decrypt the BLOB containing the encrypted PoK tests provided by the PoK server 16 (step 222). As such, the PoK tests are rendered unencrypted at the client device 12.

The user can then complete the PoK tests at the client device 12 by providing answers (step 224). For example, the picture for the picture password may be displayed at the client device 12. The user then enters a sequence of input actions for a displayed picture of the picture password. The input action sequence input by the user may be saved locally at the client device 12 to define answers for the PoK tests during the authentication process. If the PoK tests include cognitive tests, the answers to the cognitive tests can be saved locally at the client device 12 to define answers for the PoK tests during the authentication process.

The answers can then be encrypted at the client device 12 by using the EK to thereby provide encrypted answers. However, encryption of the answers is not limited to using the EK. Instead, the client device 12 may transform the answers into any cryptographic hash that could be used by the PoK server 16 to assess the results of the PoK testing. The encrypted answers and sent back to the PoK server 16 via AJAX with no redirect to the PoK server 16 (step 226).

The PoK server 16 compares the encrypted answers to encrypted "correct" answers obtained during provisioning to determine whether the user successfully passed the PoK test(s) (step 228). The results of this determination may include an authorization token (i.e., "auth_token") and instructions that are generated for the RP server 14 to control access by the client device 12 to secured services administered by the RP server 14.

The PoK server 16 communicates the auth_token in a query string to the client device 12 to redirect the client device 12 back to the RP server 14 (step 230). The RP server 14 then requests an id_token from the PoK server 16 by using the auth_token (step 232). The PoK server 16 then provides the id_token to the RP server 14 as well as one or more instructions determined from the results of the tests (step 234). Lastly, the RP server 14 verifies the user and logs the user in to grant access to the one or more secured services administered by the RP server 14 (step 236). In some embodiments, access rights to the one or more secured services is provided in accordance with instructions that define actions that designate the level of access granted to the user for a particular service.

FIGS. 4 through 6 are block diagrams of the PoK server 16, the RP server 14, and the client device 12, respectively, of the system 10 discussed above, according to some embodiments of the present disclosure. As shown, FIG. 4 is a block diagram of the PoK server 16 for providing PoK testing services according to some embodiments of the present disclosure. As illustrated, the PoK server 16 includes one or more processors 20 such as, for example, one or more Central Processing Units (CPUs), Application Specific Integrated Circuits (ASICs), and/or Field Programmable Gate Arrays (FPGAs), memory 22, and a network interface 24. In some embodiments, the functionality of the PoK server 16 is implemented in software stored in the memory 22 for execution by the one or more processors 20. In some embodiments, the PoK server 16 may include additional components responsible for providing additional functionality, including any of the functionality identified above and/or any functionality necessary to support the solutions described above.

In some embodiments, a computer program including instructions which, when executed by at least one processor, cause the at least one processor to carry out the functionality of the PoK server 16 according to any one of the embodiments described herein as provided. In some embodiments, a carrier containing the aforementioned computer program product is provided. The carrier is one of an electronic signal, an optical signal, a radio signal, or a computer readable storage medium (e.g., a non-transitory computer readable medium such as the memory 22).

FIG. 5 is a block diagram of the RP server 14 according to some embodiments of the present disclosure. As illustrated, the RP server 14 includes one or more processors 26 such as, for example, one or more CPUs, ASICs, and/or FPGAs, memory 28, and a network interface 30. The RP server 14 also includes an access controller 32 to control access to services administered by the RP server 14 in accordance with instructions. As illustrated, the access controller 32 may be embodied in, for example, one or more ASICs, FPGAs, or any combination of hardware and/or software components. In some embodiments, the functionality of the RP server 14 is implemented in software stored in the memory 28 for execution by the one or more processors 26. In some embodiments, the RP server 14 may include additional components responsible for providing additional functionality, including any of the functionality identified above and/or any functionality necessary to support the solutions described above.

In some embodiments, a computer program including instructions which, when executed by at least one processor, cause the at least one processor to carry out the functionality of the RP server 14 according to any one of the embodiments described herein as provided. In some embodiments, a carrier containing the aforementioned computer program product is provided. The carrier is one of an electronic signal, an optical signal, a radio signal, or a computer readable storage medium (e.g., a non-transitory computer readable medium such as the memory 28).

FIG. 6 is a block diagram of the client device 12 according to some embodiments of the present disclosure. The client device 12 is shown as an electronic device with a touch-sensitive display (e.g., a smartphone or a tablet) but may be embodied as any other type of client device. As shown, the client device 12 includes a control or processing system 34 that includes one or more processors 36 (e.g., CPUs, ASICs, and/or FPGAs), a memory controller 38, memory 40 (which may include software 42 such as a browser software application), and a peripherals interface 44.

The peripherals interface 44 may communicate with an external port 46, which can provide access to a power system 48. Other components in communication with the peripherals interface 44 include Radio Frequency (RF) circuitry 50 (e.g., WiFi and/or cellular communications circuitry) and audio circuitry 52 for a speaker 54 and a microphone 56 of the client device 12. Other components in communication with the peripherals interface 44 include one or more accelerometers 58 and other sensors 60. The peripherals interface 44 may communicate with an Input/Output (I/O) subsystem 62, which includes a display controller 64 operable to control a touch-sensitive display system 66, which further includes the touch-sensitive display of the client device 12. The I/O subsystem 62 also includes an optical sensor(s) controller 68 for one or more optical sensors 70. Lastly, a clock system 72 controls a timer for use by the disclosed embodiments as detailed above.

Accordingly, FIG. 6 shows components of the client device 12 that enable a user to interface with features of the disclosed embodiments. The client device 12 may include other components not shown in FIG. 6, nor further discussed herein for the sake of brevity. A person skilled in the art will understand the additional hardware and software included but not shown in FIG. 6. For example, the I/O subsystem 62 may include other components (not shown) to control physical buttons.

In some embodiments, a computer program including instructions which, when executed by at least one processor, cause the at least one processor to carry out the functionality of the client device 12 according to any one of the embodiments described herein as provided. In some embodiments, a carrier containing the aforementioned computer program product is provided. The carrier is one of an electronic signal, an optical signal, a radio signal, or a computer readable storage medium (e.g., a non-transitory computer readable medium such as the memory 40).

Those skilled in the art will recognize improvements and modifications to the preferred embodiments of the present disclosure. All such improvements and modifications are considered within the scope of the concepts disclosed herein and the claims that follow.

What is claimed is:

1. A client device, comprising:
one or more processors; and
memory containing instructions executable by the one or more processors whereby the client device is operable to:
receive a first encryption key and user data comprising one or more encrypted tests from a Proof of Knowledge (PoK) server;
receive a second encryption key from a Relying Party (RP) server;
decrypt the one or more encrypted tests by using the first encryption key and the second encryption key to thereby render one or more decrypted tests;
obtain one or more answers for the one or more decrypted tests;
send a communication to the PoK server based on the one or more answers; and
receive a communication from the RP server that authorizes a user of the client device to access one or more services administered by the RP server.

2. The client device of claim 1 wherein, in order to decrypt the one or more encrypted tests, the client device is further operable to:
generate a third encryption key from the first encryption key and the second encryption key; and
decrypt the one or more encrypted tests by using the third encryption key to thereby render the one or more decrypted tests.

3. The client device of claim 2 wherein the client device is further operable to:
encrypt the one or more answers by using the third encryption key; and
wherein the communication sent to the PoK server comprises the one or more encrypted answers.

4. The client device of claim 2 wherein the client device is further operable to:
create a cryptographic hash for the one or more answers; and
wherein the communication sent to the PoK server comprises the cryptographic hash for the one or more answers.

5. The client device of claim 2 wherein, in order to generate the third encryption key, the client device is further operable to generate the third encryption key by performing one or more logical operations on the first encryption key and the second encryption key.

6. The client device of claim 5 wherein the one or more logical operations are selected from a group consisting of: AND, OR, Exclusive OR (XOR), NOT, Not AND (NAND), Not OR (NOR), and Exclusive NOR (XNOR).

7. The client device of claim 2 wherein, in order to generate the third encryption key, the client device is further operable to generate the third encryption key by taking a split of the first encryption key and the second encryption key.

8. The client device of claim 7 wherein taking the split of the first encryption key and the second encryption key comprises performing an Exclusive OR (XOR) logical operation of the first encryption key and the second encryption key.

9. The client device of claim 1 wherein the user data is formed as an encrypted Binary Large Object (BLOB).

10. The client device of claim 9 wherein the encrypted BLOB comprises the one or more encrypted tests and one or more multimedia objects for the one or more encrypted tests.

11. The client device of claim 10 wherein the one or more multimedia objects comprise an image for a picture password PoK.

12. The client device of claim 10 wherein the one or more encrypted tests comprise one or more cognitive tests, the one or more cognitive tests comprising the one or more multimedia objects.

* * * * *